Sept. 25, 1956 G. R. BLACKMAN 2,764,311
SEALED JOINT
Filed Aug. 27, 1951
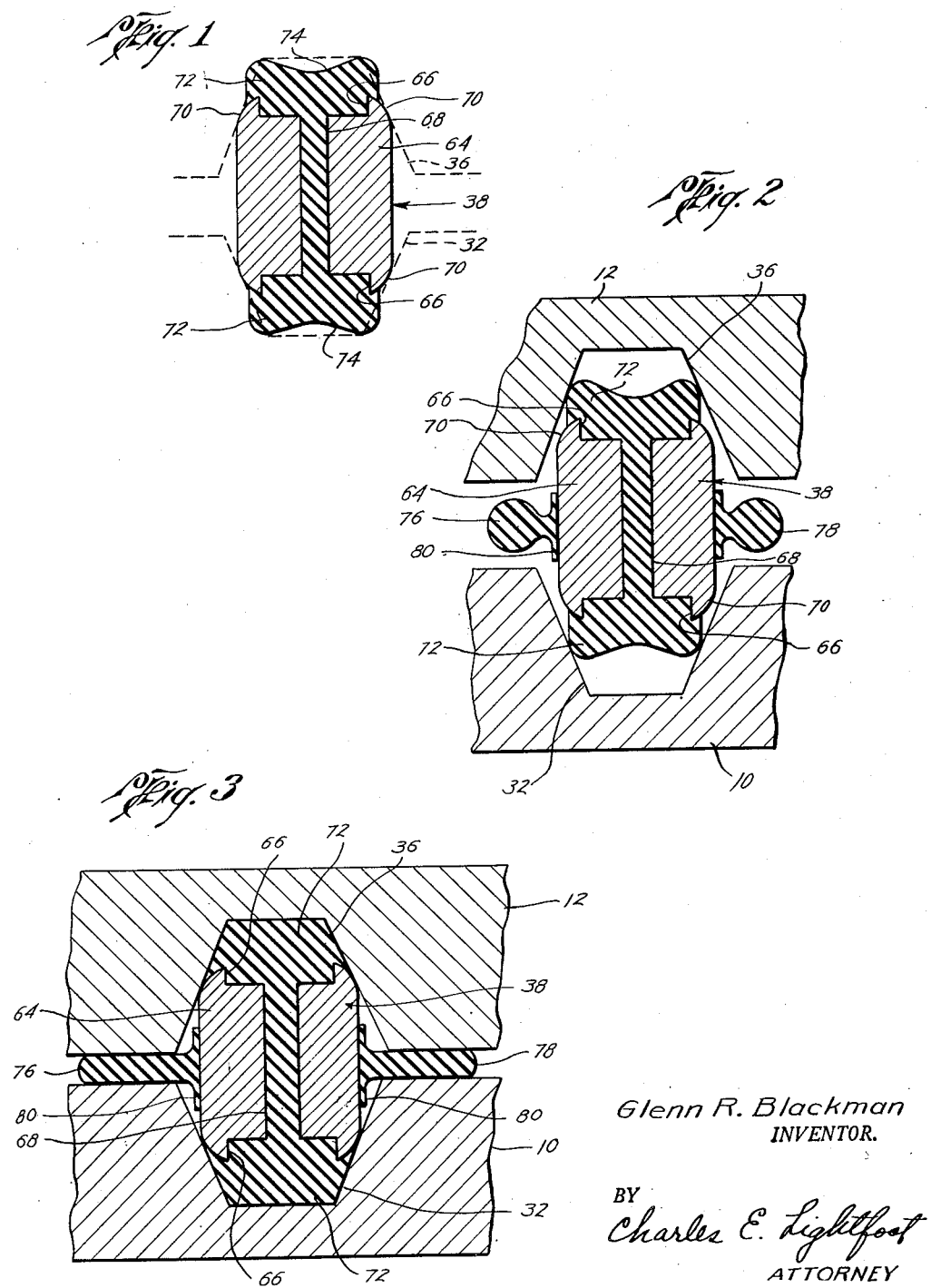
Glenn R. Blackman
INVENTOR.
BY
Charles E. Lightfoot
ATTORNEY

United States Patent Office 2,764,311
Patented Sept. 25, 1956

2,764,311
SEALED JOINT
Glenn R. Blackman, Houston, Tex.

Application August 27, 1951, Serial No. 243,850

3 Claims. (Cl. 220—46)

This invention relates to a sealed joint, and more particularly to a packing or seal ring structure adapted for use between two parts between which it is desired to maintain a fluid tight connection.

The invention is capable of broad application whereever a fluid tight connection is to be established between two members of a structure, and provides a sealing means possessing improved wearing qualities combined with great mechanical strength.

The invention has for its chief object the provision of a seal ring which is adapted to form an effective fluid tight seal between two parts under all conditions to which the parts may be subjected in use.

Another object of the invention is to provide a seal ring structure having portions formed of resilient material adapted to engage the parts to form a fluid tight seal therewith, and also having portions of relatively rigid material arranged to support the resilient portion and to protect the same against damage due to contact with the fluid.

A further object of the invention is to provide a seal ring embodying a rigid metallic body portion adapted to seat between the parts which are connected, and a resilient packing portion carried by the body and adapted to be compressed into sealing engagement with the parts.

Another object of the invention is the provision of a seal ring structure having a rigid body portion and a resilient packing material supported by the body portion, and arranged to be compressed by the body portion into sealing engagement between the parts.

A further object of the invention is to provide a seal ring structure having a rigid body which supports a non-rigid sealing means, and which is arranged to force the sealing means into sealing engagement with an adjacent part.

A still further object of the invention is to provide sealing means of the character described, which is capable of use throughout a wide range of temperatures, and which is effective to maintain a fluid tight seal between two structural parts under conditions of temperature which would ordinarily be destructive to the packing material employed.

The above and other objects and advantages of the invention will best be understood from the following detailed description constituting a specification of the same, when considered in conjunction with the annexed drawings wherein:

Figure 1 is a fragmentary cross-sectional view illustrating a preferred embodiment of the invention;

Figure 2 is a fragmentary, cross-sectional view, showing a modified form of the invention in its initial position between the two parts between which a seal is to be formed; and Figure 3 is a fragmentary cross-sectional view similar to that of Figure 2, showing the same modification of the invention in its final sealing position between the parts.

Referring now to the drawings in greater detail the invention is illustrated herein in connection with its application as a sealing element between two parts, such as a valve casing 10 and a bonnet 12 for the same.

At its upper end the casing 10 is formed with an annular groove 32, and the bonnet 12 is positioned on the top of the casing, which bonnet has an annular groove 36 in its lower surface, opposite the groove 32 in the casing. A seal ring 38, constituting a preferred embodiment of the present invention is seated in the grooves 32 and 36, and forms a fluid-tight seal between the casing and the bonnet. The bonnet is, of course, secured to the valve casing in any convenient manner, not shown.

The ring 38 comprises an annular body 64, provided with annular outwardly opening recesses 66, 66 in its opposite sides, which recesses may be connected by openings 68 extending through the body. The annular body has rounded or tapered exterior surface portions, such as those indicated at 70, 70, which are adapted to sealingly engage the side walls of the grooves 32 and 36, of the parts between which a fluid tight connection is to be established. Seal forming elements 72, 72 of suitable packing material, are disposed in the grooves 66, 66 of the body, and extend outwardly beyond the sides of the body, for sealing engagement with the parts in the grooves 32 and 36, inwardly of the rounded or tapered exterior portions 70, 70 of the body. These seal forming elements are preferably made of resilient material, such as rubber or the like, and are preferably of such construction as to substantially completely fill the spaces between the body and the bottoms of the grooves 32 and 36, when the parts reach their position of closest proximity. The seal forming elements are also preferably of a shape to engage the parts in the grooves before the body of the ring is in contact with the sides of the grooves, whereby the seal forming elements may establish a fluid tight seal with the parts, before the parts reach their positions of closest proximity.

The ring 38 may be provided with one or more additional seal forming members, such as those indicated at 76 and 78 on the inner and outer peripheries of the body 64. In the present illustration the annular seal forming members 76 and 78 take the form of O-rings formed with band-like portions 80, 80 for attachment to the body 64, but it will be understood that these members may have any suitable cross-sectional configuration adapting them for the purposes. The members 76 and 78 are sealingly engaged between the parts, as seen in Figure 3, to form additional fluid tight seals between the parts outwardly of the grooves 32 and 36.

The seal forming elements 72, 72, may be enlarged outwardly beyond the recesses 66, and shaped as shown in Figures 1 and 2, with the annular depressions 74, 74, whereby the seal forming elements are engageable with the sides of the grooves 32 and 36 substantially in advance of the body 64, and the annular recesses 74, 74, permit the elements to be forced inwardly between the sides of the grooves, to substantially entirely seal the spaces between the body and the bottoms of the grooves, when the parts are in their positions of closest proximity. In Figure 1 the parts between which the fluid seal is to be established are indicated in dotted lines, in order to clearly illustrate the manner in which the seal forming elements are shaped with relation to the grooves 32 and 36.

In making use of the seal ring 38, as described above, the ring is placed in position between the parts, the sealing elements 72, 72 being in engagement with the sides of the grooves 32 and 36, and forming a fluid tight seal therewith, before the fastening means are tightened sufficiently to engage the parts with the rigid body of the ring. In this manner, a fluid tight seal is established between the parts, without providing a metal to metal contact, and the seal ring may thus be employed where it is desirable to avoid such metal to metal contact.

Upon tightening of the fastening means a sufficient amount to bring the parts into contact with the body of the ring, the seal forming portions 72, 72 are forced farther into the grooves 32 and 36, and the contact between the rounded or tapered external portions 70, 70 of the body with the sides of the grooves, forms a seal which serves to exclude any fluid from coming in contact with the seal forming elements.

In the event that it becomes necessary to further tighten the fastening means, due to wear between the contacting surfaces, such tightening may take place, until the seal forming portions 72, 72 substantially completely fill the space between the body 64 and the bottom of the groove, as best seen in Figure 3.

Should the structure be subjected to temperature conditions which might result in injury or destruction of the seal forming elements 72, 72, the contact between the body and the sides of the groove assures that the fluid tight seal between the parts will not be broken, or if some foreign material, such as sand or the like, becomes lodged between the engaging surfaces, then the seal forming elements 72, 72 assure that a fluid tight seal will nevertheless result when the parts are connected together.

It will be apparent that the seal forming elements 72, 72, as well as the members 76 and 78 can be formed of any suitable material, such as rubber, plastic, or the like, having physical properties adapting it for such use, and that it is not intended to limit the invention to any specific material.

While the invention has been disclosed with certain embodiments of the same, it will be understood that this is intended by way of illustration only, and that numerous changes can be made in the construction and arrangement of the parts, without departing from the spirit of the invention, or the scope of the appended claims.

Having thus clearly shown and described the invention, what is claimed as new and desired to secure by Letters Patent is:

1. In a sealed joint the combination with two opposed parts having inwardly facing annular grooves whose side walls converge toward the bottoms of the grooves, of a sealing member comprising a rigid body adapted to be positioned between the parts and having external surface portions positioned for sealing engagement with the parts in the grooves and also having outwardly opening annular recesses facing said grooves and openings through the body connecting the recesses, packing material in said recesses and extending through said openings, said packing material having enlarged portions extending outwardly beyond said surface portions for sealing engagement with said side walls of said grooves and formed with annular depressions positioned between said side walls and facing the bottoms of said grooves.

2. In a sealed joint the combination with two opposed parts having inwardly facing annular grooves whose side walls converge toward the bottoms of the grooves, of a sealing member comprising a rigid body adapted to be positioned between the parts and having external surface portions positioned for sealing engagement with the parts in the grooves, said body having outwardly opening annular recesses facing the grooves, packing material in the recesses and having enlarged portions extending outwardly beyond said surface portions for sealing engagement with said side walls before said surface portions engage the parts and formed with annular depressions positioned between said side walls and facing the bottoms of the grooves.

3. In a sealed joint the combination with two opposed parts having inwardly facing annular grooves, whose side walls converge toward the bottoms of the grooves, of a sealing member comprising a rigid annular body adapted to be positioned between the parts and having external surface portions positioned to sealingly engage the parts in the grooves, said body having outwardly opening annular recesses facing the grooves, packing material in the recesses and having enlarged portions extending into the grooves beyond said surface portions for sealing engagement with said side walls of the grooves and formed with annular depressions positioned between said side walls and facing the bottoms of said grooves, and additional packing material on the inner and outer peripheries of said body in position to sealingly engage the parts outwardly of said grooves.

References Cited in the file of this patent

UNITED STATES PATENTS

| Number | Name | Date |
|---|---|---|
| 323,731 | Phillips | Aug. 4, 1885 |
| 494,402 | Walsh | Mar. 28, 1893 |
| 519,413 | Saunders | May 8, 1894 |
| 1,969,795 | Hewitt | Aug. 14, 1934 |
| 2,260,542 | Shaffer | Oct. 28, 1941 |
| 2,330,425 | Hilton | Sept. 28, 1943 |
| 2,599,767 | Long | June 10, 1952 |
| 2,687,909 | Blackman et al. | Sept. 31, 1954 |

FOREIGN PATENTS

| Number | Country | Year |
|---|---|---|
| 211,185 | Great Britain | 1923 |
| 260,610 | Italy | 1938 |